United States Patent [19]

Hutchinson

[11] Patent Number: 5,223,843
[45] Date of Patent: Jun. 29, 1993

[54] HIGH PERFORMANCE GLOBAL POSITIONING SYSTEM RECEIVER MEANS AND METHOD

[75] Inventor: William M. Hutchinson, Cedar Rapids, Iowa

[73] Assignee: Rockwell International Corporation, Seal Beach, Calif.

[21] Appl. No.: 141,250

[22] Filed: Jan. 5, 1988

[51] Int. Cl.$^5$ ............................................. H04B 7/185
[52] U.S. Cl. .................................. 342/352; 342/357; 364/459; 455/12.1
[58] Field of Search ............... 342/352, 357; 364/459; 455/12

[56] References Cited

U.S. PATENT DOCUMENTS

| | | |
|---|---|---|
| 3,701,948 | 10/1972 | McAuliffe . |
| 3,758,870 | 9/1973 | Schmitt . |
| 3,978,407 | 8/1976 | Forney . |
| 4,017,798 | 11/1977 | Gordy . |
| 4,246,653 | 1/1981 | Malm . |
| 4,290,140 | 9/1981 | Malm . |
| 4,348,641 | 9/1982 | Scott . |
| 4,385,401 | 5/1983 | Jagnow . |
| 4,601,005 | 7/1986 | Kilvington ........................ 364/602 |
| 4,613,977 | 9/1986 | Wong . |
| 4,631,738 | 12/1986 | Betts . |
| 4,648,100 | 3/1987 | Mardirosian . |
| 4,672,629 | 6/1987 | Beier ........................ 375/1 |
| 4,701,934 | 10/1987 | Jasper ........................ 342/357 |
| 4,719,469 | 1/1988 | Beier et al. ........................ 342/434 |
| 4,754,465 | 6/1988 | Trimble ........................ 375/1 |
| 4,785,463 | 11/1988 | Janc et al. ........................ 342/386 |
| 4,800,577 | 1/1989 | Tachita et al. ........................ 342/357 |
| 4,807,256 | 2/1989 | Holmes et al. ........................ 342/357 |

Primary Examiner—David Cain
Attorney, Agent, or Firm—M. Lee Murrah; V. Lawrence Sewell; H. Fredrick Hamann

[57] ABSTRACT

A high performance global positioning system receiver including a first circuit section adapted for operative association with an antenna means and including components for receiving, amplifying, and converting transmitted signals from analog-to-digital signals; and a second circuit section including components for correcting Doppler frequency shifts in the transmitted signal, removing any codes from the digitized transmitted signal, and processing and preparing the digitized transmitted signals for operative utilization by a computer processor. A substantial part of the first circuit section is reducible to micronized format, whereas the entire second circuit section is reducible to micronized format.

43 Claims, 5 Drawing Sheets

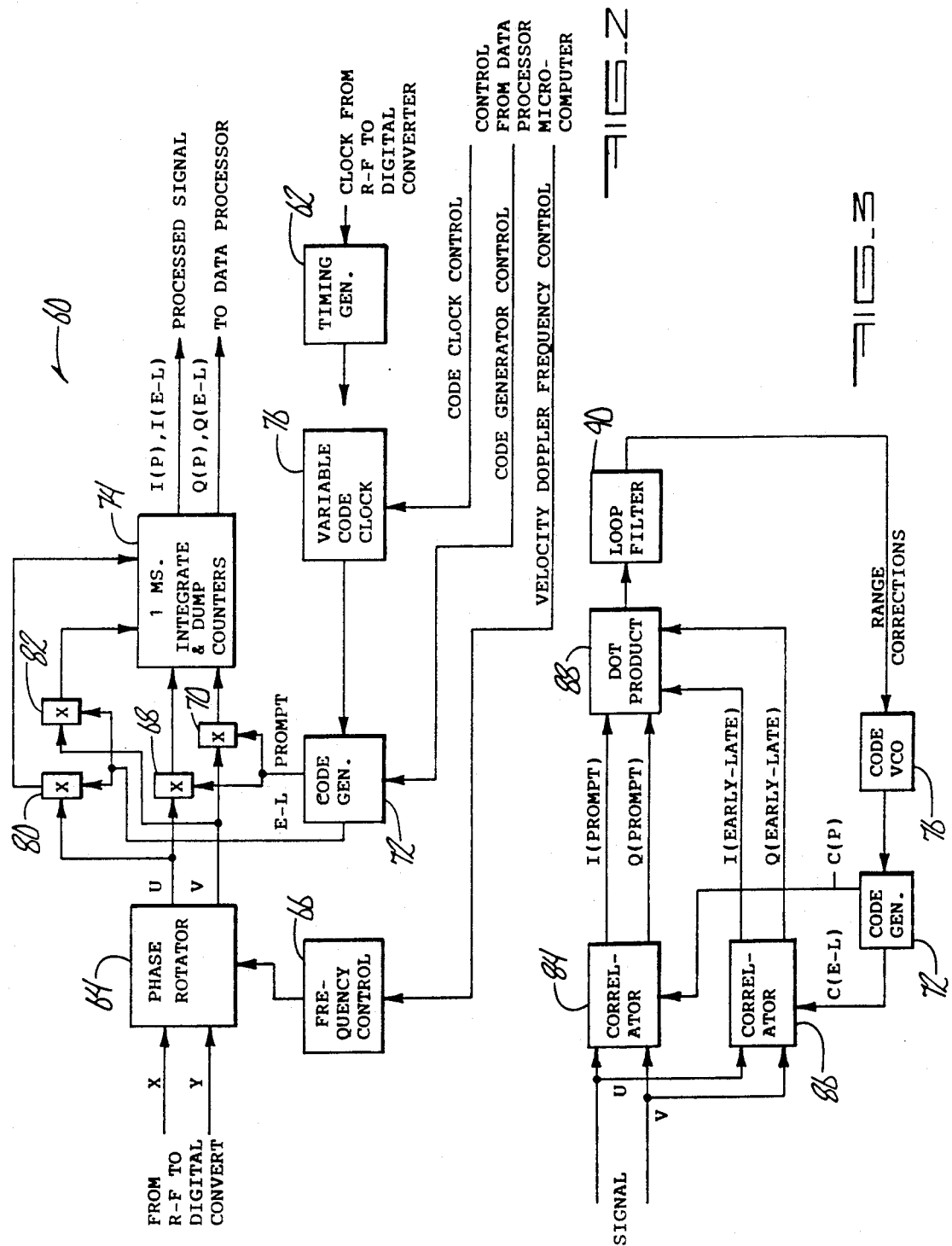

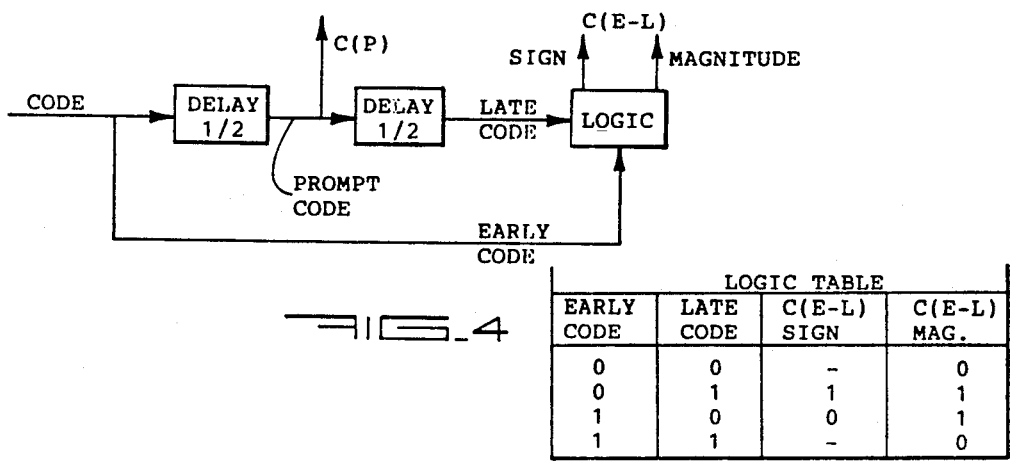
FIG_4
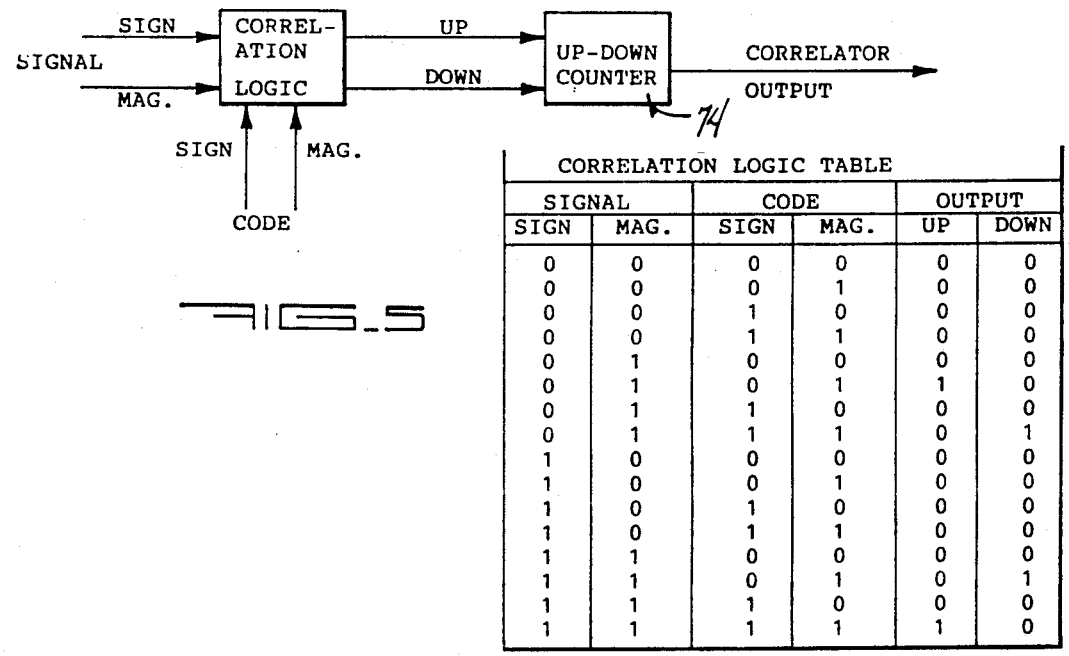
FIG_5
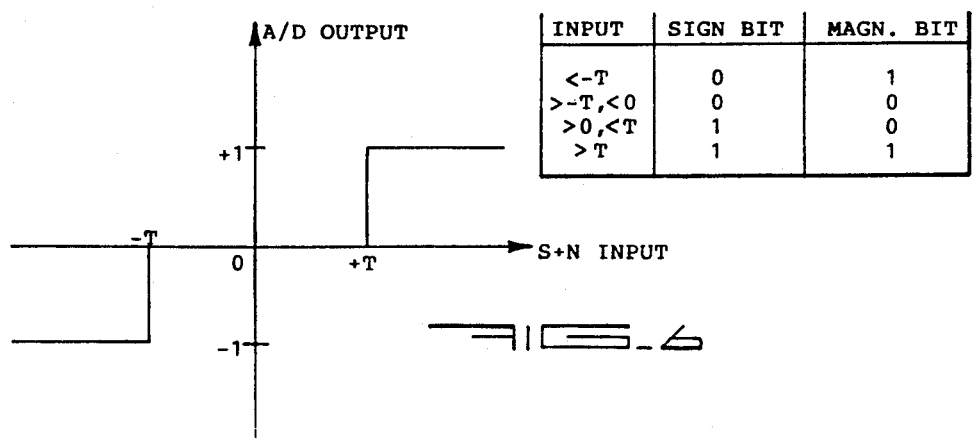
FIG_6

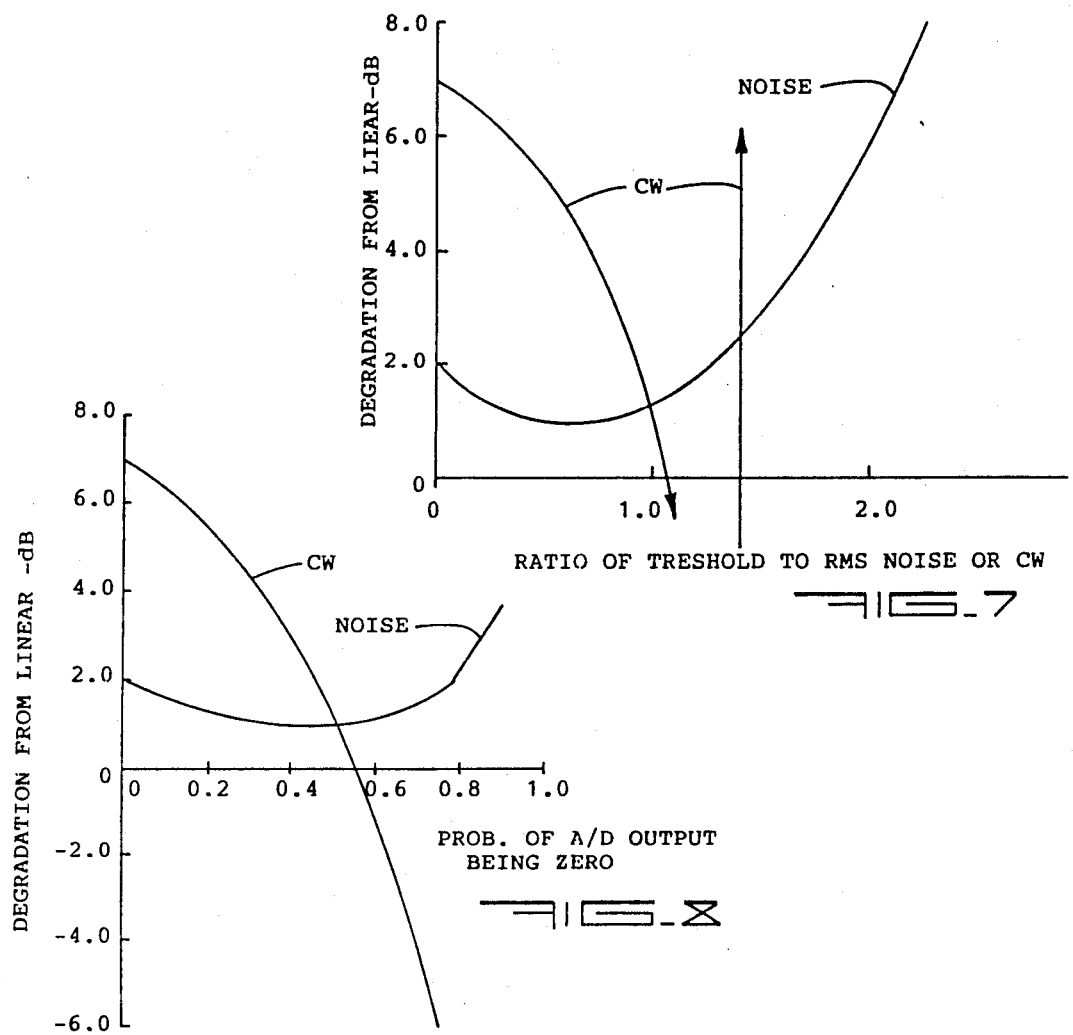
FIG_7
FIG_8
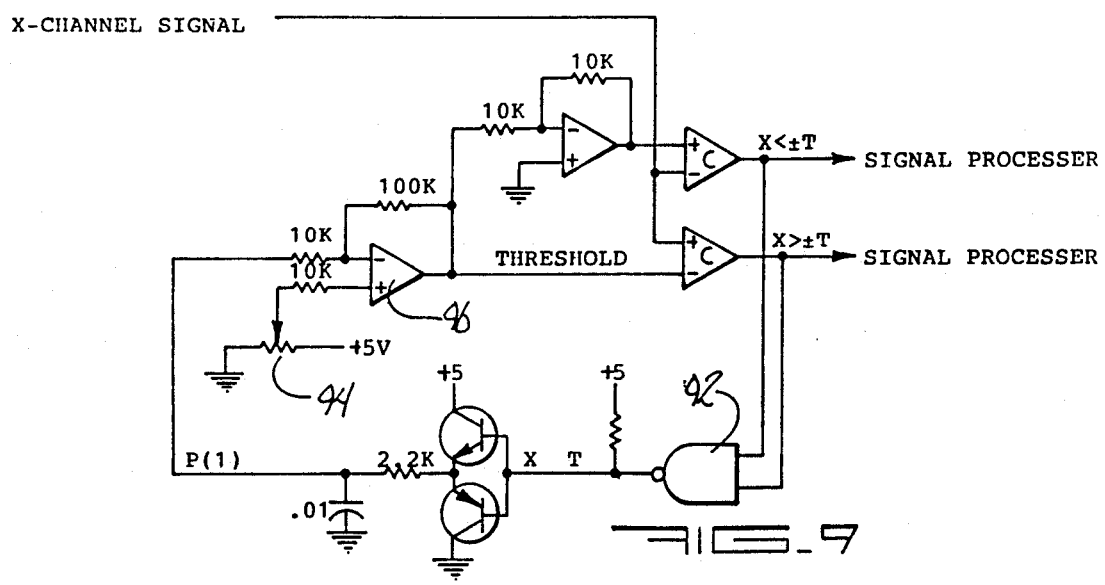
FIG_9

HIGH PERFORMANCE GLOBAL POSITIONING SYSTEM RECEIVER MEANS AND METHOD

This invention was funded at least in part by a grant from the United States Department of Defense, Air Force Division, and the Defense Advanced Research Project Agency (DARPA), under Contract No. F29601-85-C-0022. The Government, through these agencies, may have certain rights in the invention.

BACKGROUND OF THE INVENTION a. Field of the Invention

The present invention relates to global positioning systems, and in particular, to a high performance global positioning system receiver means and method.

b. Problems in the Art

A procedure has been developed which allows derivation of three-dimensional location and velocity (if applicable) of a vehicle or user, to a high degree of accuracy. The procedure, and components involved in the procedure, are known as the global positioning system (or GPS); all of which is well known within the art. The general principles involved in such a system are also well known within the art, and described in U.S. Pat. No. 4,613,977 to Wong, et al., issued Sep. 23, 1986; the contents of which is incorporated by reference herein. Additional background material, incorporated by reference herein, is set forth at the end of this specification.

The purpose of the global positioning system is to enable highly accurate, virtually instantaneous determination of a user's position and velocity. Obviously, it therefore can be used to continuously keep track of position and movement, and can be used as an navigational tool. GPS generally involves receiving and decoding signals transmitted from a plurality of satellites, the signals containing information such as time and position of each satellite. By processing of the signals according to GPS theory, user position (and velocity) can be derived.

Although different types of global positioning systems have been developed and are in use, there still exists areas for improvement in the components and methods used. There is room for improvement in the speed, accuracy and performance of global positioning systems. Additionally, there is a need for miniaturizing hardware components to substantially decrease the size of the devices needed to accomplish global positioning; to make the system more powerful with higher performance, and to simplify it for more efficiency and economy. Certain methods currently used in global positioning are simply not as efficient or accurate as desired, and need to be improved upon.

Therefore, it is a principal object of the present invention to provide a high performance global positioning system receiver means and method which improves over or solves the problems and deficiencies in the art.

Another object of the present invention is to provide a means and method as above described which improves the overall performance and accuracy for a global positioning system.

A further object of the present invention is to provide a means and method as above described which allows simplification and reduction of substantial portions of the components for the receiver, allowing the same to be micronized, both improving the performance and economy of the system.

Another object of the present invention is to provide a means and method as above described which is fast, accurate, efficient, and economical.

These and other objects, features, and advantages of the present invention will become clear with further reference to the specification and claims.

SUMMARY OF THE INVENTION

The present invention improves the performance of a conventional global positioning system. It includes a two-stage or two-section receiver which utilizes components and methodology resulting in improvements upon the conventional receiver hardware and procedures currently in use. Additionally, the present invention's utilization of components and methodology allows micronization of a substantial portion of the combined stages.

The present invention further can select a certain signal from one satellite, can be configured to allow for either simultaneous receipt of a plurality of signals from global positioning satellites, or be multiplexed to sequentially receive those signals. This can easily be accomplished by those having skill in the art.

First, the receiving stage of the system of the invention functions to receive the radio frequency signals from the satellites, and then convert them from analog to digital signals. Secondly, the processing stage then operates on the digital signals to derive the position and navigational information from the signals and prepare it for use by a computer to ultimately compute position and other navigational factors.

The invention operates quickly and efficiently, and does not require some of the space-consuming and costly components of conventional receivers and pre-processing circuitry. The processing stage functions to correct for Doppler shift in the received satellite signals, remove the modulated code contained in the radio frequency signals from the satellite, and remove the modulated positioning data from the carrier wave. The present invention also allows for adjustment to fine tune its high performance operation.

The present invention is operatively connectable to a conventional radio frequency receiving antenna used with conventional global positioning systems, and also is operatively connectable to a digital computer which incorporates appropriate software to control tracking and acquisition of the satellite signals, and calculate the navigational results desired.

BRIEF DESCRIPTION OF THE DRAWINGS

FIG. 2 is a schematic representation of the second stage of the present invention which comprises the components for frequency correction, demodulation of navigation data, removal of code modulations, and processing of the signals for preparation for use in the computer.

FIG. 3 is a schematic representation of a code lock loop for tracking the codes contained in the signals transmitted by the global positioning satellites.

FIG. 4 is a schematic representation of generation of the binary word to represent and identify the codes being received, and includes a logic table for interpreting the binary words.

FIG. 5 is a schematic representation of how the binary words are correlated, and includes a logic table to interpret the same.

FIG. 6 is a schematic representation of the output and input gain for a preferred embodiment of the analog-to-digital converter of the present invention and includes a table of values related to the binary word output from the analog-to-digital converter.

FIGS. 7 and 8 graphically depict performance of an analog-to-digital converter according to a preferred embodiment of the invention.

FIG. 9 is an electrical circuit schematic of a three-level analog-to-digital converter including an adaptive threshold adjustment.

DETAILED DESCRIPTION OF THE PREFERRED EMBODIMENT

I. Overview

Figure 1:
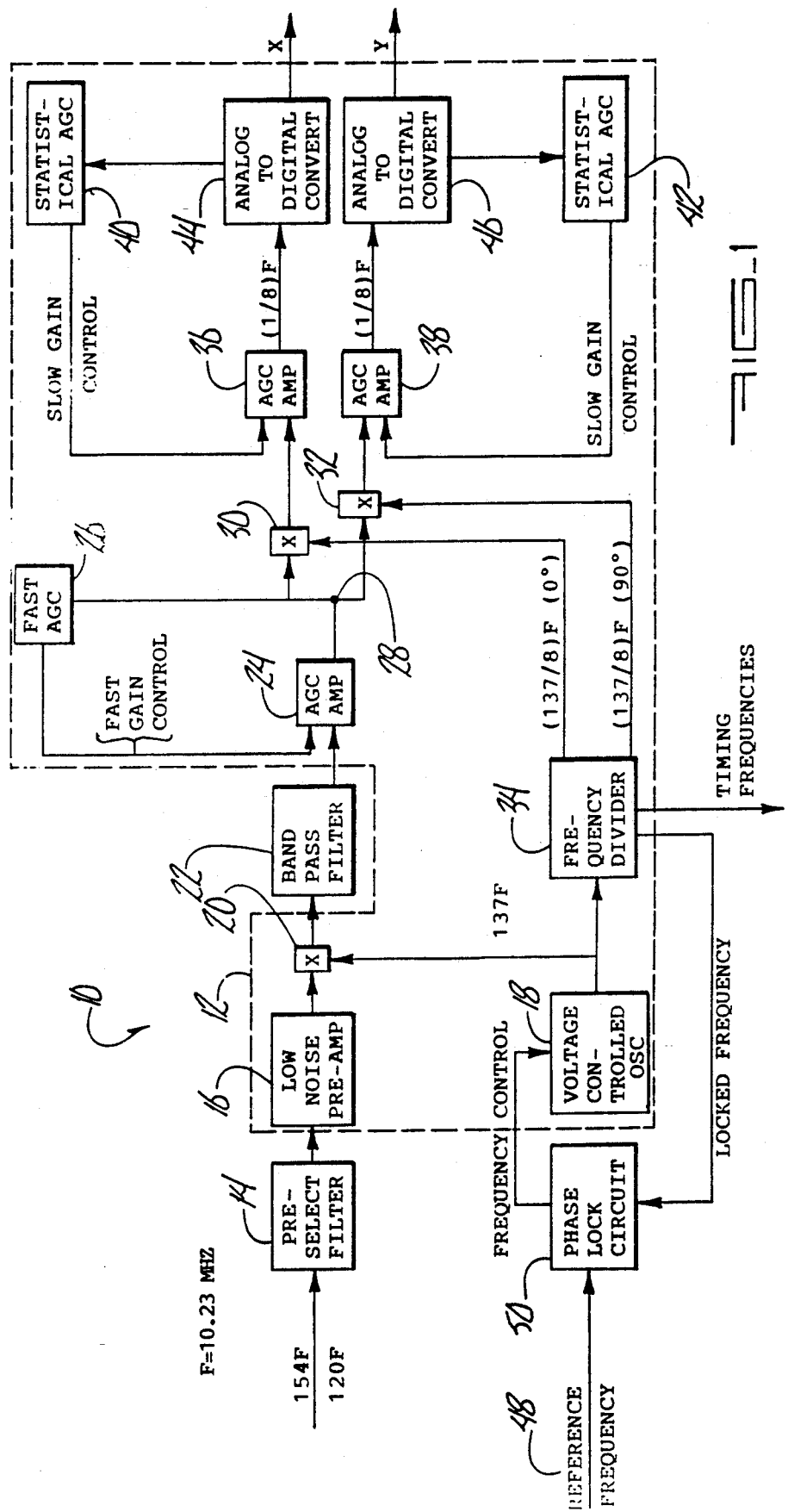
FIG. 1 is a schematical representation of the first stage of the present invention which comprises the radio frequency receiver and analog to digital conversion components.

A preferred embodiment of the present invention will now be described with reference to the accompanying drawings. Like reference numerals will represent like components throughout the drawings and description.

FIGS. 1 and 2 represent generally a preferred embodiment of the high performance global positioning system receiver means and method. The remaining drawings illustrate specific qualities, or embodiments of subcomponents of the general system of FIGS. 1 and 2.

The preferred embodiment of FIGS. 1 and 2 will first be discussed with alternatives and additional components following thereafter.

II. The Preferred Embodiment of FIGS. 1 and 2

A. Stage 1—Receiver/Digital-to-Analog Conversion

By particular reference to FIG. 1, the first stage of the general preferred embodiment of the invention is schematically depicted. The circuitry of FIG. 1 will be referred to as "first stage 10". It is to be understood that dashed line 12 encloses all of the components which can be easily micronized (that is, reduceable to micro-circuit format), which is one of the objects of the present invention.

Generally, the transmitted or broadcast signals (radio-frequency or r.f. waves) from the global positioning satellites are captured by a conventional, known in the art antenna (not shown and not a part of this invention), and these signals are then introduced to pre-select filter 14. As is conventional, broadcast signals from the satellites are centered at one of two frequencies (1575.42 megahertz (MHZ) and 1227.60 (MHZ)). It is further known that these two signals are referred to in the art as "L1" and "L2", respectively. For purposes of the following description, and by design of the present invention, the frequencies of signals L1 and L2 can be alternatively referred to as 154 F and 120 F, where "F" equals 10.23 MHZ. 10.23 MHZ, by design, is the frequency of one of two codes which are modulated into the transmitted satellite signals and is referred to as the P-Code. The second code is referred to as the C/A Code and is at 1.023 MHZ. Modulations are unique for each satellite. Pre-select filter 14 controls which of signals L1 or L2 will be allowed to pass to the following parts of first stage 10. It is to be understood that each of the components described before and hereafter are interconnected by appropriate electrical conducting pathways, such as are known in the art.

The signal from pre-select filter 14 is amplified in low-noise pre-amp 16. An injection frequency of 137 F generated in voltage controlled oscillator 18 is injected into the amplified signal at frequency mixer device 20. 137 F is selected as the first injection frequency because it is midway between L1 (154 F) and L2 (120 F), and it allows a single frequency, 17 F, to be used in subsequent operations.

Band-pass filter 22 passes all the mixed signal (now at an intermediate frequency (i.f.) of 17 F) in further filtered form to AGC (automatic gain control) amplifier 24. AGC amp 24 is controlled by a fast AGC function device 26 which is inserted in the conventional AGC servo-loop connected between the output of AGC amp 24 and the gain control input of AGC amp 24. It is to be understood that the terminology "fast" is utilized to describe that the AGC combination 24 and 26 responds quickly to changes in signal level, but the response is still relatively slow compared to the modulation rate of 10.23 MHZ.

The output of the AGC combination 24 and 26 produces a level signal which is split into two pathways at junction 28, with the signal being sent to a pair of identical quadrature mixers 30 and 32. A frequency divider 34 introduces injection frequencies of 17-1/8)F into each quadrature mixer 30 and 32. The injection frequencies are derived from the division of first injection frequency 137 F by 8. The only difference between the injection frequencies to quadrature mixers 30 and 32 is that they are out of phase by 90°, as is shown in FIG. 1 (one at 0° phase, the other at 90°). This phase difference is produced by binary frequency divider 34, a result of which is readily obtainable from divider 34, such as is known in the art.

The outputs from quadrature mixers 30 and 32 are then sent to identical sub-circuit combinations for conversion from analog-to-digital. At this point, the signals are mixed down to an intermediate frequency (i.f.) of 1/8 F. In the embodiment shown in FIG. 1, signals are fed to AGC amps 36 and 38 which are provided slow gain control by statistical AGC function devices 40 and 42, which again are basically within an AGC servo-loop for each AGC amp 36 and 38. As opposed to AGC amp 24 (with fast AGC function device 26), AGC amps 36 and 38 (with their statistical function devices 40 and 42), can be "slow" in the sense that speed is not critical, and therefore these subcircuits can operate slower, but can then be made more accurate. The purpose of "slower" AGC amps 36 and 38 is to adjust for manufacturing tolerances and minor defects due to temperature changes. AGC amps 36 and 38 serve to accurately adjust the signal level relative to the threshold level of the analog to digital converters 44 and 46. An equivalent implementation is to adjust the threshold level relative to the signal level. This is the implementation described subsequently relative to FIGS. 7, 8 and 9.

The output of each AGC amp 36 and 38 carries intermediate frequency signals of 1/8 F into analog-to-digital (A/D) converters 44 and 46 which issue digital signals representing the content of the analog signals, and which are designated as X and Y signals, as shown in FIG. 1. It is to be understood that the X and Y signals are digitized quadrature representations of the received satellite signal selected by the receiver 10. X and Y are used to represent the quadrature components before frequency connection. U and V will represent corresponding components after Doppler frequency correction, whereas I and Q will represent corresponding components after integrate and dump counters 74 in FIG. 2.

It can therefore be seen that the first stage of the preferred embodiment of the invention selects a desired frequency signal which has been captured from the global positioning satellites, amplifies the signal, mixes it to the intermediate 137 F frequency, filters it again, levels the signal in the fast gain control AGC amplifier, splits the signal into the quadrature mixers, and then processes it through the slow gain control AGC amps into the analog-to-digital converters. The split, differently phased signals are then digitized and ready to be further processed. The signals are accurate and have been appropriately pre-processed for the use at hand. Importantly, almost all of the components of first stage 10 can be reduced to micro-circuitry.

Further characteristics of the components of first stage 10 are as follows. Pre-select filter 14 is either switched or otherwise controlled to select one of the two global positioning system signals, L1 or L2. Low noise preamplifier 16 can optionally include switched filters to improve the selectivity of preselect filter 14.

The selection of 137 F as the first injection frequency, being at the midpoint between L1 and L2, enables it to function for both of those frequencies (i.e., mixing 137 F with either L1 or L2 produces a first, intermediate frequency of 17 F). The second injection frequencies of (137/8)F are mixed with the split 17 F signals to produce second intermediate frequencies basically centered at (1/8 F) with a band width of 10.23 F. It has been observed that although these values seem to indicate distortion by spectrum fold-over around d-c (direct current), because the signal is represented in a quadrature component, the apparent distortion is in effect cancelled in subsequent processing of the signal, which utilizes both quadrature components.

It is further noted that quadrature mixers 30 and 32 are assumed to include low pass filters to restrict band width to that necessary for proper analog-to-digital (A/D) conversion. The first and second injection frequencies are generated by utilizing a reference frequency 48 which is derived from a frequency standard component (not shown and not a part of the invention) which is a required part of a global positioning system receiver. Voltage controlled oscillator 18 receives frequency control from phase lock circuit 50 by being phase locked to reference input frequency 48.

In the present invention, all frequencies utilized are multiples of the GPS P-code frequency of 10.23 MHZ (which has and will alternatively be referred to as "F"). Phase lock circuit 50 locks these frequencies to the frequency reference 48, is made up of conventional circuitry, and includes any frequency scaling required to match the reference frequency 48 to the sub-multiple of voltage control oscillator 18. Phase lock circuit 50 does not have to be a part of first stage 10. It is to be understood that the micro-circuit within dashed line 12 is conveniently and most easily implemented if the sub-multiples from frequency divider 34 result from divisions by a power of two. Examples of typical values are 87.6 MHZ (divide-by-16); 43.6 MHZ (divide-by-32); or 22.8 MHZ (divide-by-64). In the preferred embodiment, the sub-multiples are 175.19 MHZ (divide-by-8). Frequency divider 34 provides the divide-by-8 function, provides the sub-multiple frequency to phase lock circuit 50, and provides a sub-multiple frequency to be used for timing in the second stage processor of the present invention.

Analog-to-digital conversion by A/D converters 44 and 46 is most easily accomplished with these types of sub-multiple frequencies. Two preferred embodiments exist for A/D converters 44 and 46, depending upon what type of interference might exist externally of the GPS receiver.

If there is intentional unfriendly jamming interference, the preferred embodiment of the invention can utilize what will be called a three level A/D converter. This type of converter requires the setting of the input level of the signal (relative to the threshold level), so that the input signal magnitude is above the set threshold for a desired fraction of time. The converters output a binary digit having first a sign bit and then a magnitude bit which indicates if the absolute magnitude of the input is above or below the set threshold level. The statistical AGC function devices 40 and 42 operate to average the number of magnitude bits which indicate the threshold was exceeded by the input signal, compare this average to the set threshold, and then adjust the gain to AGC amplifiers 36 and 38 by means of the AGC servo-loop so that the average is the desired value. Again, it is to be understood that AGC amps 36 and 38 accurately adjust the signal level relative to the threshold level of analog-to-digital converters 44 and 46; but an alternative procedure would be to adjust threshold levels relative to the signal level, as discussed with respect to FIGS. 7, 8 and 9.

It has been found that although it is possible to set the threshold to match the characteristic of the fast AGC amp 24, a better practice is to avoid this adjustment and enable the statistical AGC function devices 40 and 42 to automatically set the input level to A/D converters 44 and 46. Again, because preceding AGC amp 24 is "fast", speed of AGC amps 36 and 38 is not critical. It is to be understood that if rapid changes in the receiver input signal level are not expected, such as due to pulse jamming, the fast AGC function device 26 can be eliminated and statistical AGC function devices 40 and 42 can be made moderately "faster".

The three level A/D converters are particularly beneficial when there is constant amplitude (sine wave or angle modulated sine wave) interference present in the receiver input signal; such as in a military environment. However, if there is no such type of interference likely, A/D converters 44 and 46 can be of the type which are called "simple hard limiters". These type of converters simply output a sign bit, and no magnitude bit.

B. Stage 2—Signal Processor

The second stage of the present invention comprises a signal processing circuitry schematically depicted in FIG. 2. As can be seen, the "X" and "Y" digital signals from A/D converters 44 and 46 (see FIG. 1) are input into the second stage (which will be designated generally as 60). It is to be understood that all of the components of second stage 60 are reducible to microcircuit size, and that all functions of the processor are implemented with digital logic circuits.

Timing is provided by timing generator 62 which operates from the timing frequencies developed in frequency divider 34 of first stage 10 (see FIG. 1). As can be seen, additional control signals are provided from the computer (not shown), namely, a code clock control signal, a code generator control signal, and a velocity Doppler frequency control signal, all of which will be discussed below.

Digital signals X and Y received from the first stage 10 (FIG. 1) initially enter phase rotator 64 which performs 90° rotations of the vector (X,Y) in response to the command of frequency control device 66. Phase rotator 64 outputs digital signals designated as "U" and "V", corresponding to signals "X" and "Y", and alternatively can be designated as vector (U,V). These outputs U and V occur when the first stage 10 has acquired and is tracking the input signal. Outputs U and V are phase-locked to the receiver injection frequencies.

The sine bits of signals U and V are input into code mixers 68 and 70 which receive in turn input from code generator 72 so as to multiply off either the P code or the C/A code. Code generator 72 duplicates the code sequences applied by the satellite transmitters.

The output from the code mixers 68 and 70 is introduced into integrate and dump counters (designated by reference numeral 74), and operate only with regard to the sine bit representation of the signal. Their function is therefore as up-down counters, recognizing "0" as positive and "1" as negative. The resulting digital signals (designated as I(P), I(E-L) and Q(P), Q(E-L), are then in form for transmittal to and processing by the processing computer (not shown). Typically, these signals are 8-bit words usable in standard computer equipment.

The specific characteristics of second stage 60 are as follows. Phase rotator 64 operates to perform a 90° rotation of vector (X,Y) by simply exchanging X and Y in a logic switch, and changing the sign bits of X and Y to advance or retard the phase. Frequency correction is given by the rate at which the phase is advanced or retarded. It was discovered that the large phase steps cause only a small degradation of the signal-to-noise ratio; that being less than one db.

The frequency corrections introduced to phase rotator 64 are the sum of the velocity Doppler corrections, both positive or negative, and the positive (1/8)F offset remaining from the second down conversion (second frequency injection to produce 1/8)F second intermediate frequencies) in first stage 10. The fixed offset is built into frequency control 66 so that the data processor computer needs only compute the Doppler velocity. Since this (1/8)F offset greatly exceeds any possible Doppler, only phase retards are applied to phase rotator 64, which represents a substantial design simplification for this type of device.

Code mixers 68 and 70, in the preferred embodiment, are basically exclusive-or logic devices which operate on the sequence of U and V sign bits, and on the sequence of code bits. After the signals are processed by code mixers 68 and 70, it is to be understood that the spectrum of the signal is collapsed from 10.23 MHZ (or 1.023 MHZ depending on which code contained in the signal is to be used) to 50 HZ, which is the data rate applied by the satellite transmitter. A significant advance over analog circuits is realized in the mechanization of this function in logic circuits. The feed-through of the signal input in an analog mixer limits the theoretical suppression of a narrow band interferring signal. The present invention overcomes this problem.

The integrate and dump counters 74 provide the first step of narrow band filtering on the received signal, reducing the band width of the noise on the signal to 1 KHZ, which is the reciprocal of 1 millisecond. When the receiver is tracking, subsequent integrate and dump filtering in the data processor computer software itself will further reduce bandwidth to 50 HZ. However, 1 KHZ is an appropriate and sufficient bandwidth because the software also performs signal acquisition in the 1 KHZ bandwidth.

Magnitude bits of signals U and V are utilized to disable the integrate and dump counters 74 when magnitude is "0", which occurs when the signals are less than the three level A/D converter's threshold. Counters 74 therefore operate only when the magnitude bits U and V are "1". This makes the three level A/D converter effectively function as a "null zone" limiter. It is to be understood that these components operate the same way for the two level A/D converter, because the magnitude bit is not used if the circuitry assumes it always to be "1".

The specifics of how the codes are multiplied off will now be discussed. Code generator 72 initially receives a code generator control signal from the computer which sets the initial state of the code sequences. The code generator control signal accomplishes this by a set of giant steps to advance or retard the phase of the code sequences. A variable code clock 76 is operatively connected to code generator 72 and allows for fine adjustments to the code phase. This is done by supplying a code clock control signal from the processor computer which adjusts the frequency of variable code clock 76, which in turn drives code generator 72.

It is to be understood that small errors of less than 1 code bit interval in the code phase are detected in the data processor computer software by comparing early and late (early minus late) integrations of the output of code mixers 68 and 70. The first method to accomplish this function is as follows. The code sequence supplied to code mixer 68 and 70 is dithered early and late by the data processor computer and the magnitude of the early and late signal vectors is compared to provide a code phase error which is then used to adjust the variable code clock 76. One problem with this conventional method is that the signal-to-noise ratio is lowered because the code is uncentered part of the time.

FIG. 2 depicts the second method. A second set of code mixers 80 and 82 mix a logical combination (early minus late, E-L), provided by code generator 72. The combination is the code sequence advanced one-half a bit interval (early) and the code sequence retarded one-half a bit interval (late) from the prompt (centered) code. This results in an exclusive-or logical combination operation on the early code sequence and (the one bit retarded) late code sequence. It is determined then if the early and late sequence bits are the same or different; and if the bits are of the same value, whether they are "1" or "0".

Under this method, therefore, three outputs are possible; namely, first, the bits differ, second, the bits are both of "1" value, and third, are both of "0" value.

For the first case, where the early and late bits are different, the mixer output is deleted at the input to the integrate and dump counters 74. For the second case, where the bits are both "1", mixers 80 and 82 invert the sign bit of U and V. For the third case, where the bits are both "0", the mixers pass the sign bit of U and V unaltered. The results of these operations is the same as though U and V had been mixed (multiplied) by both the early code sequence and the late code sequence in separate mixer pairs, and subsequently subtracted either before or after the integrate and dump function. However, only one additional mixer pair (80 and 82) and one additional integrate and dump filter is required to process the result instead of two. The code phase error is derived in the processor software by taking the dot product of the early minus late vector (I(E-L), Q(E-L)) and the prompt vector (I(P), Q(P)) from the integrate and dump filter counters 74. The result is a sign and magnitude signal which is used to correct code clock 76.

This second method results in an approximate 5 db improvement in signal-to-noise ratio relative to the dithered code approach, and involves only the addition of microcircuitry for code mixers 80 and 82 and an additional integrate and dump up-down counter 74. The prompt signal, which is used for tracking the carrier phase is not degraded by being dithered off its centered position, and because the components are micronized, any increase in hardware is minimal compared to the benefit obtained.

C. Specific Sub-Embodiments

1. Code Lock Loop

The specific sub-circuitry utilized for a code lock to track the codes (sometimes referred to as PN codes) transmitted by global positioning satellites is set forth schematically in FIGS. 3-5. All GPS receivers require such a code lock to provide the satellite range measurements upon which position determination is based. The general function of the code lock is to compare the correlation of the signal and an "early" code, with the correlation of the signal and a "late" code; thereby providing a way for adjusting the code generator phase to center a "prompt" code on the signal code. FIG. 3 depicts the embodiment of code tracking utilizing two correlators which operate without time sharing (or dithering). It is to be understood that conventional implementation of code tracking determines the magnitudes of the early correlation and the late correlation and subtracts these magnitudes. Three correlations are required, early and late for the code tracking function, and prompt for carrier tracking and data demodulation. High performance systems utilize three hardware correlators to accomplish this; whereas, commercial designs intended for applications with low dynamics and no intentional interference utilize one or two hardware correlators which are time shared to derive the three correlations.

In the preferred embodiment of FIG. 3, prompt correlator 84 and early-late correlator 86 are utilized to derive a code loop error signal. A dot product function "device" 88 implemented by data processor software provides the sign information to correct the tracking error. The sign information would not be available from the magnitude of the (E-L) correlation. The early and late codes are subtracted prior to multiplication of the signal, and the product of the code difference (E-L) and the signal are integrated. The dot product is sent through loop filter 90 also mechanized in software. The resulting range corrections are then sent to the variable code clock 76 which in turn transmits the signals to code generator 72. The output from code generator 72, C(E-L) and (C(P), are then sent back to correlators 86 and 84, respectively.

This method of code tracking is further set forth with reference to FIGS. 4 and 5. In FIG. 4, the schematics show that the code difference is expressed as a two bit word, namely, sign and magnitude. To further understand this process, consider the binary code sequence as an analog signal with a value of plus or minus ½. The difference between two different code sequences can take on the values 0, or plus or minus 1. The (E-L) code (that is, C(E-L)) is then represented by a sign bit (plus or minus) and a magnitude bit (0 or 1). Understand also that the signal is also similarly represented by sign and magnitude bits. The process multiplying the code and signal in the subsequent integration of the same is shown in FIG. 5. The product causes the up-down counter 74 (see FIG. 2) to be incremented when both magnitude bits are one and the sign bits are the same. It also causes counter 74 to be decremented when the sign bits are different and both magnitude bits are one. As shown in the correlation logic table of FIG. 5, there are four such conditions. When, however, both magnitude bits are not one, the up-down counter 74 is not changed.

It is to be understood that this correlation applied to the early-late code and one component (I or Q) of the signal (as shown in FIG. 5) can also be accomplished with regard to the other component of the signal. Additionally, the prompt code can be represented as a binary sequence of a single bit (sign only), but the same processing applies; the prompt code amplitude can be considered as a constant one. Also, this technique can be used in an analog implementation where inputs to an analog integrator are simply switched off and the code magnitude bit is "0". Further reference can be taken to U.S. Pat. No. 4,385,401, which is incorporated herein by reference.

2. Three Level Analog-to-Digital Conversion

FIGS. 6-8 depict with more specificity the characteristics of the three level A/D conversion described previously as one alternative embodiment of analog-to-digital conversion for the present invention.

The value of a three level A/D converter instead of a hard limiter (or two level A/D converter) is that when the received signal contains constant amplitude interference or jamming, the hard limiter suppresses the desired signal relative to the interference with a 7 db signal-to-interference loss relative to linear processing or multi-bit A/D conversion, whereas, three level A/D reduces the loss to about 1 db.

Three level A/D converts the F/8 intermediate frequency (i.f.) I and Q outputs to digital format. By referring to FIG. 6, the output versus input "gain" characteristic of this conversion is shown along with a table of the value of a two bit sign and magnitude word related to the output. Thus, in subsequent processes, only output words with a magnitude bit of "1" would be processed, and these will be processed as one bit words. The words with a magnitude bit of "0" are assigned a 0 level by the A/D converter, and are ignored.

FIG. 7 depicts the performance of the three level A/D as a function of threshhold (T). The value of T is normalized as a factor of the RMS level of the input signal. The value of $T=0$ is the same as a one bit A/D or hard limiter converter. The curve for CW, a constant amplitude interference, shows a 7 db degradation for $T=0$. However, this reduces to 1 db for $T=1$. An improvement relative to linear processing is possible for values of T between 1 and 1.4. However, beyond $T=1.4$, the degradation is infinite. In that case, the threshold is above the peak value of the signal so that the A/D converter never has a non-0 output. Additionally, the improvement up to $T=1.4$ is more theoretical than actual due to a mixture of noise and CW which is always actually present. FIG. 7 also depicts the curve for white noise interference and depicts that there is a modest improvement near T=1. However, this would probably not justify its complexity relative to a one bit, hard limiter analog-to-digital converter. It is to be understood that the main application of three level A/D is where CW interference can be expected.

FIG. 8 depicts the performance of three level A/D with respect to the probability of the output of the three level A/D being 0. The abscissa represents the fraction of 0 outputs from the three level A/D, and is clearly related to the threshold setting used in FIG. 7. The probability of one-half corresponds to the threshold T=1. This suggests the means used to control the threshold setting to its desired value. The fraction of a non-zero output is measured and the threshold is adjusted, and the feedback moved to force this measurement to the desired value.

FIG. 9 schematically depicts the circuitry which can be utilized for three level analog-to-digital conversion. As depicted, the X-channel signal is compared to positive and negative thresholds of value T. If the magnitude of the signal is greater than T, the logic nand gate 92 has a five volt output. If the magnitude of the signal is not greater than T, the output of gate 92 is 0 volts. The output P(1) is filtered and is a value between 0 and 5 volts representing the fraction of outputs which are non-0. This value is compared to an adjustable level allowed by varistor 94 with respect to the inputs to operational amplifier 96. The output of this comparison is the threshold T. T is automatically adjusted so that P(1) equals the adjustable level between 0 and 5 volts. This process is necessarily slow relative to the modulation rate of the input signal, since many inputs must be averaged to provide a steady threshold. It is to be understood this would be a serious disadvantage in the presence of intentional jamming which was time-varying in amplitude in a manner to defeat the adaptive threshold. This can, however, be solved with the use of fast AGC as previously mentioned, and as further discussed below.

3. Fast AGC

AGC (Automatic Gain Control) discussed with respect to FIG. 1 has been a feature of radio design since its inception, except that its response speed is usually slow.

In a global positioning system receiver, the essential feature is the speed with which it corrects for changes in the input signal level. Prior to correlation, the GPS signal is at least 30 db below the receiver front end noise, and therefore changes in input signal are due entirely to changes in the level of interferring signals, not changes in the GPS signal level.

A comparison between radio frequency (r.f.) limiting and AGC is helpful in understanding fast AGC applied to the present invention. Hard limiting may be thought of as instantaneous AGC where changes in input signal level are instantaneously corrected. The output signal can contain no level variations. Being a non-linear process, the difficulty in using hard limiting in a GPS receiver is that it will suppress the desired signal relative to the interference in a manner similar to that discussed with respect to three level A/D conversion. To avoid this non-linear operation, the receiver must allow amplitude variations typical of the filtered noise of the receiver output. This restricts the response time of the AGC to no faster than several times (about ten) the reciprocal of the amplifier band width. For GPS, the AGC time constant is set at approximately 10 pn chip intervals (about 1 microsecond).

With this time constant, value changes in the level of interferring signals are followed up to a rate of 1 MHz. Changes in interference levels due to geometrical position changes are easily followed, and most generally interferring signals cannot change the level too fast to be followed. In effect, the gain of the receiver is lowered when the interference is large and raised when it is small. Communication theory provides the verification that this processing is beneficial. Therefore, it has been found that with fast AGC no jamming signal is more effective than a constant amplitude CW jammer.

Fast AGC complements the operation of a three level analog-to-digital converter. The fast AGC rapidly adjusts the input level to the A/D converter to a constant, and the statistical threshold adapts itself to that level in a way which compensates for circuit component variations.

4. Frequency Plan for The Invention

As has been previously mentioned, the present invention utilizes a unique frequency plan to carry out its operation, which will be discussed in more detail below with respect to FIGS. 10 and 11.

Figure 10:
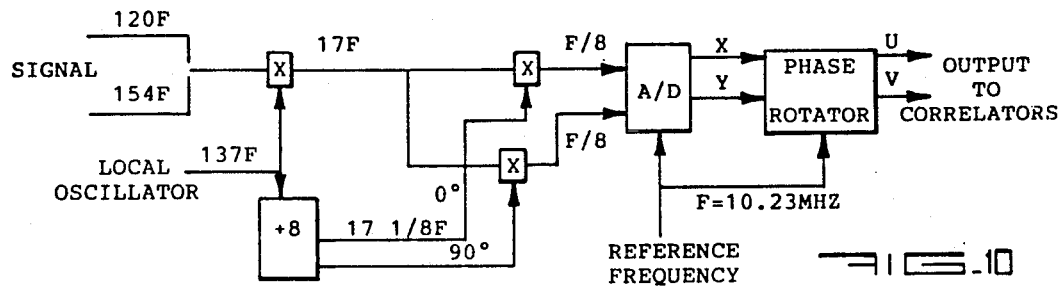
FIGS. 10 and 11 are schematic representations of the frequency plan utilized in the preferred embodiment of the invention, FIG. 11 depicting specifically the function of the phase rotator, including a logic table.

As is also shown, generally in FIGS. 1 and 2, the overall frequency plan for the preferred embodiment of the present invention is depicted at FIG. 10. First injection frequency 137 F from oscillator 18, as mentioned before, is midway between the two GPS carrier frequencies of 120 F and 154 F. This provides the same injection frequency for either of the input frequencies without the need for switching the injection frequency to produce the same intermediate frequency.

Frequency divider 34 takes first injection frequency 137 F and produces second injection frequency of (17 1/8) F [or (137/8(F] by a divide-by-eight circuit which also naturally contains the logic to provide 0° and 90° outputs for quadrature mixers 30 and 32. This is needed for the I and Q outputs.

Because the output from the first mixer 20 is 17 F, the output from the quadrature mixers 30 and 32 is F/8 (about 1.3 MHZ). The band width of this injection frequency is about 10 MHZ. This apparent anomaly is not a problem because of the signal representation in quadrature components. Additionally, the advantages of operation of the I and Q channels at a non-zero frequency are that gain and gain control can be applied without concern about DC stability, and imbalances in the A/D converter and the other elements of the I and Q channels are averaged in the phase rotator 64.

Phase rotator 64 serves two purposes. First, the F/8 frequency is converted to DC prior to correlation. Secondly, the velocity (Doppler shift) corrections are also made.

Figure 11:
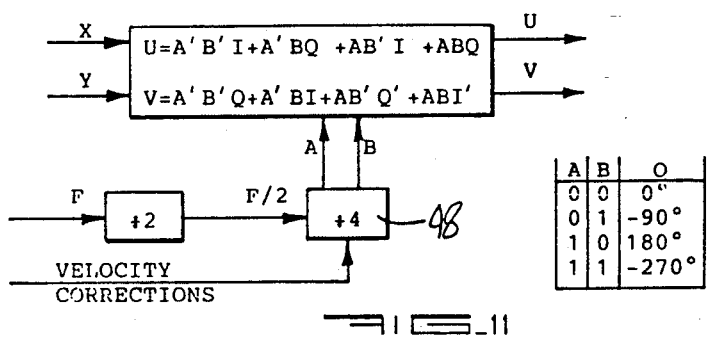

FIG. 11 depicts the make-up of phase rotator 64. The inputs I and Q channels are processed with periodic phase rotations in a manner which provides the F/8 frequency downshift. While the matrix transformation for rotating a two dimensional vector is well known, at least two features of its application to the present invention are as follows.

As shown in the table of FIG. 11, phase rotation is restricted to 90° increments. Phase rotations are thereby simply a combination of the sign reversals and X and Y exchanges. All operations are on the sign bits of the X and Y inputs only, and no multiplications are required.

This represents a simplification with minimum performance loss because the phase rotations take place prior to correlation. The phase noise caused by the large phased increments of 90° is smoothed in subsequent filtering.

Secondly, the required frequency shift of F/8 is equivalent to a 90° phase shift every two cycles of F. 90° is therefore subtracted from the phasing signal at an F/2=5.25 MHZ rate. Unlike the phase corrections applied to compensate for the relative velocity of the receiver and the transmitting GPS satellite, this rate is much too high for use in a programmable processor/computer. Phase rotator 64 therefore includes circuitry which automatically corrects this problem. As shown at FIG. 11, the divide-by-4 circuit 98 outputs a most significant bit (MSB) labeled "A" and a least significant bit (LSB) labeled "B". A and B cycle through the four counter states corresponding to 0 through 3 negative 90° phase shifts as shown in the table of FIG. 11. As the divide-by-4 counter 98 counts the F/2 inputs, it causes the phase rotator logic to apply the periodic phase shifts required for a F/8 frequency shift. From this point it is simple to add or subtract counts from the divide-by-four counter 98 to account for the velocity corrections.

5. Carrier Tracking Loop

Figure 12:
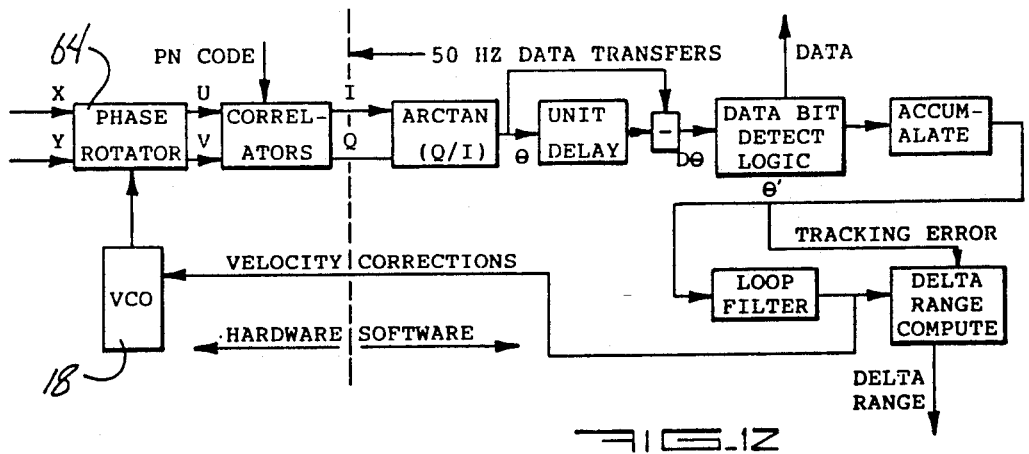
FIG. 12 is a schematic representation of a carrier wave tracking loop depicting both hardware and software functions.

FIG. 12 shows the carrier tracking loop which is included in all GPS receivers. Carrier tracking provides velocity data relative to the transmitting GPS satellites. It also allows the 50 HZ data sent by the satellites to be decoded. Because the GPS processor uses velocity data for navigation, it is not unusual for the carrier tracking loop to be implemented digitally and partially in the processor to simplify the data interface. Analog carrier tracking is possible, but it is difficult to accurately convert the frequency corrections to digital words for use by the computer.

For carrier tracking loops mechanized in software, the processing load is a major consideration. Conventional tracking loop designs require approximately a 20 HZ loop band width to maintain track during vehicle dynamics. Where processing is by software, this requires about a 200 HZ sample rate to run the loop. In the present invention, a carrier tracking loop design is improved so that a 5 HZ loop band width will track the vehicle dynamics, and the required sample rate is about 50 HZ. 50 HZ is a convenient number because it is the satellite data rate and is the lowest rate at which the signal can be processed, even if the receiver is stationary. The carrier tracking loop of FIG. 12 performs the following functions. First, it provides a recursive estimate of the frequency of the received signal (or relative velocity of the receiver). This is necessary to keep the signal within the band width of the correlators. Secondly, it differentially demodulates the satellite data from the received carrier. Third, it provides delta range (velocity) measurements to the navigation software. Phase rotations are applied to the received signals to remove the Doppler shift. The signal is then correlated and applied to the processor software. The correlation process consists of taking the exclusive-or of the code bits and the U and V sign bits and accumulating for 1/50 second. In the design described, the first step in this process takes place in the correlators embodied in the code mixers 68 and 70 (see FIG. 2) and the 1 MS (millisecond) integrate and dump counters 74 (see FIG. 2). The second step is the summing of twenty outputs of counters 74 which takes place in the processor software.

The output of the correlators is the I and Q data occurring at a 50 HZ rate. Following the software processing of the correlations, the computer will output (at a 50 HZ rate) velocity commands to the voltage controlled oscillator 18 (VCO 18). VCO 18 is actually a number generator which converts the velocity corrections to 90° phase rotations for the phase rotator.

Within the software, special techniques are used to allow operation at a 50 HZ sample rate and maintain track. Sine wave angles are by nature measurable at between plus and minus 180° and often the measurements are limited to plus or minus 90°. Conventional phase tracking loops lose lock when the combined tracking error due to dynamics and noise exceeds the measurement range. In the software for the design described the phase ($\theta$) of the signals computed and the phase change over one sample interval $D\theta$ is computed. $D\theta$ will in effect be servoed to 0. The bit detect logic tests $D\theta$ for a change greater than 90°. If this is detected, it is assumed that there is a 180° phase modulation caused by the satellite data. The data detect logic outputs the data and removes the 180° phase shifts from $D\theta$ which is then accumulated to $\theta'$ which is the tracking error. This is applied to the loop filter which besides filtering, converts it to a velocity number. While $D\theta$ can only be measured to plus or minus 90°, $\theta'$ can be accumulated to many cycles of tracking error. The loop can therefore operate with large tracking errors without losing lock. This allows the loop band width to be narrowed, which in turn allows operation at a 50 HZ rate. The restriction on the range of $D\theta$ is not very significant. It is unlikely that a 90° tracking error will occur over a 1/50 second interval. This method therefore accumulates small differential angle errors measurable to plus or minus 90° into a large, numerically unbounded tracking error. This allows a larger tracking error without loss of lock; allows the resulting narrower tracking band width; and allows the reduced processing rate. Thus, by tracking change of phase instead of tracking phase, as with the other GPS receivers; and because of larger tracking error without loss of lock, the present invention can retain lock even if the user of the receiver is traveling very fast or making violent maneuvers, such as in aircraft.

Delta range is the integration of velocity over a defined interval. GPS receiver specifications place tight requirements on the delta range accuracy which would not be satisfied in the presence of large tracking error. This problem is solved in the software by adding the tracking error to the accumulated delta range. This yields a precise delta range measurement. It is not significant that the noise of the tracking error addition is not filtered in the tracking loop prior to the computation of delta range.

C. Operative Results

It can therefore be seen that the present invention achieves at least all of its stated objectives. The radio frequency (r.f.) to analog-to-digital conversion is processed in a first stage, whereas the signal processing and interfacing with the processing computer is achieved in a second stage Using modern microcircuit technology, both the r.f. to analog-to-digital functions of FIG. 1, and the signal processing functions of FIG. 2 can be reduced to micro-circuits. For the signal processor, an appropriate technology is 1.25 micron bulk CMOS, and for the r.f. to digital converter, GaAs MMIC is an appropriate technology (enclosed in dashed line 12 of FIG. 1).

The included preferred embodiment is given by way of example only, and not by way of limitation to the invention, which is solely described by the claims herein. Variations obvious to one skilled in the art will be included within the invention defined by the claims.

Reference material on GPS generally, and on previous types of receiver design, can be found in the Global Positioning Monograph, published by the Institute of Navigation, Volume I (1980) and Volume II (1984) edited by P. M. Janiczek, and Volume III (1986) edited by Stephen W. Gilbert; and specifically see the following articles:

1. J. J. Spilker, Jr., "GPS Signal Structure and Performance Characteristics", Volume I, pp. 29-54;
2. M. J. Borel, et al., "Texas Instrument Phase One User Equipment", Volume I, pp. 87-102; and
3. R. J. Milliken, et al., "Principles of Operation of Navstar and System Characterisics", Volume I, pp. 3-14.

These materials are incorporated by reference herein.

What is claimed is:

1. A high performance global positioning system receiver means for receiving transmitted signals from one or more global positioning satellites and deriving information therefrom used in calculating at least user three-dimensional position and velocity, said transmitted signals from said satellites containing a carrier wave at radio frequency, data regarding ranging information modulated on the carrier wave, and at least one code pseudo-randomly modulated to the carrier wave comprising:

a first circuit means including a transmitted signal receiving means, adapted for operative association with an antenna means, for receiving, amplifying and converting transmitted signals from analog to digital signals, said first circuit means comprising;
first filter means for selecting a predetermined frequency band signal of the transmitted signal;
first amplifying means for pre-amplifying the selected frequency band signal from the first filter means;
first frequency mixer means for mixing a first injection frequency into the selected frequency band signal to produce a first intermediate frequency signal;
second amplifying means for selectively amplifying the first intermediate frequency signal;
signal splitting means for directing the first intermediate frequency signal into first and second pathways;
a pair of second frequency mixer means, each mixing an identical but differently phased second injection frequency into said first and second parts of the first intermediate frequency signal to produce differently phased second intermediate frequency signals in each of the first and second pathways;
a pair of comparator means for comparing the level of the differently phased second intermediate frequency signals;
a pair of analog-to-digital converter means for converting the differently phased second intermediate frequency signals passed by the comparator means to digital signals; and
a second circuit means including a signal processing means for processing the digital signals from the first circuit means into ranging information usable in calculating at least the user's position and velocity comprising;
frequency correction means for correcting velocity Doppler frequency shifts in the transmitted signal as now represented by the digital signals;
third frequency mixer means for mixing appropriate frequencies to multiply off the modulated codes in said digital signals;
carrier demodulation means for removing the carrier wave frequencies from the data modulated thereto;
means for processing and preparing the digital signals for operative utilization by computer means.

2. The receiver means of claim 1 wherein the first circuit means includes a voltage controlled oscillator adapted for operative connectio to a source of stable reference frequency for providing a frequency output to be utilized in producing the first and second injection frequencies.

3. The receiver means of claim 2 wherein the first circuit means includes a frequency divider means for dividing the output of the voltage control oscillator means, and including identical outputs for directing second injection frequencies to the pair of second frequency mixer means, said frequency divider including means for offsetting the phase of the second injection frequency from each output.

4. The receiver means of claim 3 wherein the first circuit means includes a phase lock circuit means for locking the phase of any stable reference frequency with that produced by the voltage control oscillator means and frequency divider means.

5. The receiver means of claim 3 wherein the frequency divider means includes a timing output means for utilizing the output of the frequency divider means for timing purposes for other parts of the receiver means.

6. The receiver means of claim 1 wherein the first injection frequency is 137 F, where F equals 10.23 megahertz.

7. The receiver means of claim 3 wherein the output of the frequency divider means is 137 F divided by 8, where F equals 10.23 megahertz, and the two outputs are related by 90° in phase.

8. The receiver means of claim 7 wherein the second intermediate frequency is F divided by eight, where F equals 10.23 megahertz.

9. The receiver means of claim 1 wherein the first circuit means includes a switching means associated with the first filter means for selecting a desired transmitted frequency band signal.

10. The receiver means of claim 1 wherein the first circuit means includes a multiplexing switch means for switching between multiple inputs.

11. The receiver means of claim 1 wherein the first amplifying means of the first circuit means includes switch filter means to improve the selectivity of the first circuit means.

12. The receiver means of claim 1 further comprising a plurality of first and second circuit means for processing transmitted signals from two or more satellites simultaneously.

13. The receiver means of claim 3 wherein the output of the voltage control oscillator means is divided by the frequency divider means by an integer power of 2.

14. The receiver means of claim 1 wherein the second amplifying means comprises an automatic gain control circuit including an automatic gain control amplifier connected in an automatic gain control servo loop with a fast automatic gain control function means for providing fast automatic gain control, whereas gain is lowered in the presence of interference, and gain is raised as interference decreases.

15. The receiver means of claim 1 wherein each second frequency mixer means comprises a quadrature mixer.

16. The receiver means of claim 1 wherein each comparator means comprises an automatic gain control amplifier.

17. The receiver means of claim 16 wherein the comparator means further comprises a statistical automatic gain control function means connected in an automatic gain control servo loop with the automatic gain control amplifier to provide slow gain control to the automatic gain control amplifier, whereby the output from the second frequency mixer means is compared to a predetermined level.

18. The receiver means of claim 14 wherein each comparator means comprises an automatic gain control amplifier having a statistical automatic gain control function means connected thereto in an automatic gain control servo loop for providing slow gain control to the automatic gain control amplifier, so that the fast automatic gain control circuit compensates for time varying amplitude interference, and the slow comparator means provides improved accuracy over long intervals.

19. The receiver means of claim 1 wherein each analog-to-digital converter means is a three level converter, wherein the converter includes means for recognizing three signal levels, greater than a threshold level, less than the negative of the threshold level, and in between the threshold level and the negative of the threshold level.

20. The receiver means of claim 19 wherein the converter means includes means to output a digital word having a first bit representing the sign of the signal, whether negative or positive, and a second bit representing the magnitude of the signal, the magnitude falling within the three level, and if the magnitude exceeds the threshold level or is less than the negative of the threshold level, a digital one is output.

21. The receiver means of claim 19 wherein the converter means includes a pair of signal-to-threshold comparator means for comparing the positive and negative values of the threshold level with the signal, and outputting the signal if it exceeds the threshold.

22. The receiver means of claim 21 wherein the converter means further comprises adaptive threshold adjustment circuitry including logic means which produces a positive voltage signal if the magnitude of the signal exceeds a threshold level; filtering means for passing voltage a signal representing a fraction of outputs from the comparator means which are non-zero; comparator means for comparing the filtered value with an adjustable variable voltage, the output of this comparison being the threshold level determined by the analog-to-digital converter means.

23. The receiver means of claim 1 wherein the frequency correction means comprises a phase rotator means which receives the digitized signals from the first circuit means, said digitized signals being offset in phase by 90°, and also receives a velocity Doppler frequency control correction signal computed in a processing computer; a frequency control means for receiving the velocity Doppler frequency control correction signal, and which outputs a frequency control signal to the phase rotator means, so that digitized signals are rotated 90° and the velocity Doppler error is corrected.

24. The receiver means of claim 1 wherein the second circuit means includes a code generator means for duplicating the codes modulated to the transmitted signal, and directing the duplicating codes to the third frequency mixer means so that the codes can be multiplied off from the digitized signals.

25. The receiver means of claim 24 wherein a variable code clock means for fine adjustment of the code generator means is operatively connected to the code generator means, and operates from timing frequencies obtained from the first circuit means of the receiver means.

26. The receiver means of claim 1 wherein the second circuit section further comprises fourth frequency mixer means connected in parallel to the pair of third frequency mixer means, and receiving as one input the digitized signal and as a second input, a code generator signal from a code generator means for duplicating the modulated code of the transmitted signal, the output of the fourth frequency mixer means being directed to the means for processing and preparing the digital signals for operative utilization by computer means.

27. The receiving means of claim 1 wherein the means for processing and preparing the digital signals to the second circuit means comprises integrate and dump counter means for receiving digitized signals mixed in the third frequency mixer means, counting zero and one values of the digitized signal, and creating eight bit digital signals which can be utilized by computer means and which represent the navigational component of the transmitted signals.

28. The receiver means of claim 23 wherein the phase rotator means converts the signal to direct current.

29. The receiver means of claim 28 wherein the signal, prior to entering the phase rotator means, is at F divided by eight where F equals 10.23 megahertz.

30. The receiver means of claim 1 further comprising a carrier tracking loop means for tracking the carrier wave of the selected transmitted signal from the satellite, providing velocity information regarding the receiver means with respect to the satellites, and demodulating navigational information from the carrier portion of the transmitted signal, and includes a phase rotation means for correcting any Doppler shift between the transmitted signals from the satellite to the receiver means, and correlator means for preparing the signals for software processing.

31. The receiver means of claim 30 wherein the software means includes means for demodulating the navigational information from the carrier wave of the transmitted signal, means for deriving tracking error for the carrier wave of the transmitted signal, means to compute and derive delta range information, and means to derive velocity information.

32. The receiver means of claim 30 wherein the output of the correlator means is at 50 hertz, which is the data rate for navigation information on the transmitting signal from the transmitting satellites.

33. The receiver means of claim 1 further comprising a code lock loop means for tracking the modulated code on the transmitter signal from the satellites, including means for generating early, late, and prompt codes, means for subtracting the early code from the late code, means for correlating the value of the subtracted early minus late code, means to correlate the prompt codes, and software means to multiply the correlated prompt and early minus data codes to produce a code tracking error signal.

34. The receiver means of claim 33 further comprising first and second delay means connected in series, the prompt signal being produced after passing the signal through the first delay means, the late signal means produced after passing the signal through both first and second delay means, whereas the early signal is not passed through either a first, second and delay means.

35. The receiving means of claim 34 further comprising a logic device means which subtracts the early code signal from the late code signal and outputs two signals, first indicating whether the remainder is positive or negative, the second containing the magnitude of the remainder.

36. The receiver means of claim 33 wherein the correlator means comprise a correlator logic device means and an up-down counter means, the correlator logic device means receiving two bit binary signals representing the digitized signal and two bit signals representing digitization of the code, and outputting a two bit binary word representing the multiplication of the two bit signal and code, that output being received by the up and down counter means which is incremented when both magnitude bits are one and sign bits are the same, and which is decremented when the sign bits are different and both magnitude bits are one.

37. The receiver means of claim 1 wherein a majority of the first circuit means is reducible to microcircuit format; and all of the second circuit means is reducible to a microcircuit format.

38. The receiving means of claim 37 wherein portions of the first circuit means reducible to microcircuit format can be comprised of hardware on the order of 1.25 micron bulk CMOS.

39. The receiver means of claim 37 wherein the second circuit means is reducible to microcircuitry on the order of a single GaAs MMIC.

40. A high performance global positioning system receiver means for receiving global positioning system signals carried at frequencies centered generally at 154 F and 120 F, where F=10.23 Mhz, comprising: a first circuit section including;
  frequency selection means for selecting between the 154 F or 120 F carrier frequency;
  frequency generation means adapted to receive a stable reference frequency and convert the same into 137F frequency, that frequency being midway between 154 F and 120 F frequency;
  means for injecting the 137 F frequency into the selected signal carrier frequency, and to mix the same;
  signal splitting means for splitting the mixed carrier signal and 137 F generated signal into two pathways;
  frequency divider means for dividing the 137 F frequency by an integer power of 2;
  means for injecting the divided 137 F frequency into both pathways and to mix the same to produce a fraction of F frequency;
  means to convert the fraction of F frequency into a digital
  representation;
  a second circuit section including;
  means to convert the fraction of F frequency to DC;
  means to process the DC signal to a form usable by a computer means, said DC signal containing the global positioning system information.

41. The means of claim 40 wherein the integer power of 2 is taken from the subset comprising 2, 4, 8, 16, 32, and 64.

42. The means of claim 10 wherein the integer power of 2 is 8, wherein 137 F divided by 8 equals 17.125 F, which is approximately equal to the difference between 154 F and 137 F, and the difference between 120 F and 137 F.

43. A high performance global positioning system receiver means comprising:
  carrier tracking loop means for tracking a carrier wave transmitted by the global positioning system satellites to obtain velocity information and to decode globe position system information, including;
  phase rotation means for removing the Doppler shift from the signal, said signal having been digitized;
  correlation means for correlating digitized code and digitized signal signs by taking the exclusive-or logic function result of the same and accumulating this result;
  number generator means converting velocity information to phase rotation;
  differentiating means for deriving the derivative of the result.

* * * * *